United States Patent
Denissen et al.

(10) Patent No.: US 12,514,650 B2
(45) Date of Patent: Jan. 6, 2026

(54) DEEP BRAIN PATH PLANNING USING AUGMENTED REALITY

(71) Applicant: KONINKLIJKE PHILIPS N.V., Eindhoven (NL)

(72) Inventors: Adrianus Johannes Maria Denissen, Moergestel (NL); Raymond Van Ee, Geldrop (NL); Rudolf Mathias Johannes Nicolaas Lamerichs, Liempde (NL); Jean-Marc Huijskens, Eindhoven (NL); Timmy Robertus Maria Leufkens, Upplands Väsby (SE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 335 days.

(21) Appl. No.: 18/035,861

(22) PCT Filed: Nov. 4, 2021

(86) PCT No.: PCT/EP2021/080568
§ 371 (c)(1),
(2) Date: May 8, 2023

(87) PCT Pub. No.: WO2022/096540
PCT Pub. Date: May 12, 2022

(65) Prior Publication Data
US 2023/0404678 A1    Dec. 21, 2023

(30) Foreign Application Priority Data

Nov. 9, 2020  (EP) ..................................... 20206434

(51) Int. Cl.
*A61B 34/20*   (2016.01)
*A61B 34/10*   (2016.01)
(Continued)

(52) U.S. Cl.
CPC .............. *A61B 34/20* (2016.02); *A61B 34/10* (2016.02); *A61B 90/37* (2016.02); *A61N 5/1049* (2013.01);
(Continued)

(58) Field of Classification Search
CPC ......... A61B 34/20; A61B 34/10; A61B 90/37; A61B 2034/107; A61B 2034/2055;
(Continued)

(56) References Cited

U.S. PATENT DOCUMENTS

| | | |
|---|---|---|
| 2009/0005678 A1 | 1/2009 | Schmiedehausen |
| 2011/0245625 A1 | 10/2011 | Trovato |

(Continued)

FOREIGN PATENT DOCUMENTS

| | | |
|---|---|---|
| EP | 0945814 A2 | 9/1999 |
| EP | 0945814 A3 | 2/2001 |

(Continued)

OTHER PUBLICATIONS

PCT International Search Report, International application No. PCT/EP2021/080568, Jan. 4, 2022.

*Primary Examiner* — Paula J Stice

(57) ABSTRACT

Disclosed herein is a medical system (200, 300) comprising an augmented reality system (204) configured for rendering virtual objects within a visual three-dimensional field of view of an operator (214). Execution of machine executable instructions (230) causes the computational system to: receive (400) segmented medical imaging data (100, 232) descriptive of a continuous volume of a subject (210) comprising at least a portion of a brain (102) of the subject and a cranial surface (106) of the subject; control (402) the augmented reality system to determine a registration (234) between the subject and the segmented medical imaging data; receive (404) a target location (104) within the at least
(Continued)

a portion of the brain; discretize (406) the cranial surface to define multiple entry locations (108); determine (408) a straight path (110) for each of the multiple entry locations that extends to the target location; assign (410) a path score (238) to the straight path for each of the multiple entry locations using the segmented medical imaging data; calculate (412) a three-dimensional path score surface defined by the cranial surface and is descriptive of the path score of each of the multiple entry locations; and render (414) the three-dimensional path score surface using the augmented reality system, wherein the rendered three-dimensional path score surface is positioned in the visual three-dimensional field of view of the operator using the registration.

18 Claims, 7 Drawing Sheets

(51) Int. Cl.
| | | |
|---|---|---|
| *A61B 90/00* | (2016.01) | |
| *A61N 5/10* | (2006.01) | |
| *G01R 33/48* | (2006.01) | |
| *G06T 19/00* | (2011.01) | |

(52) U.S. Cl.
CPC ........ *G01R 33/4806* (2013.01); *G06T 19/006* (2013.01); *A61B 2034/105* (2016.02); *A61B 2034/107* (2016.02); *A61B 2034/2055* (2016.02); *A61B 2090/365* (2016.02); *A61N 2005/1055* (2013.01); *G06T 2210/41* (2013.01)

(58) Field of Classification Search
CPC ............ A61B 2090/365; A61N 5/1049; A61N 2005/1055; A61N 5/103; G06T 19/006
See application file for complete search history.

(56) References Cited

U.S. PATENT DOCUMENTS

| | | | |
|---|---|---|---|
| 2017/0065349 | A1* | 3/2017 | Ourselin ................ A61B 34/10 |
| 2017/0215968 | A1 | 8/2017 | Rodriguez-Ponce |
| 2017/0265943 | A1 | 9/2017 | Sela |
| 2018/0078316 | A1 | 3/2018 | Schaewe |
| 2018/0140362 | A1 | 5/2018 | Cali |
| 2018/0177406 | A1 | 6/2018 | Kim |

FOREIGN PATENT DOCUMENTS

| | | |
|---|---|---|
| EP | 3298968 A1 | 3/2018 |
| WO | WO2010080611 A2 | 7/2010 |
| WO | WO2014139024 A1 | 9/2014 |
| WO | WO2016083927 A1 | 6/2016 |
| WO | WO2016083927 A8 | 6/2016 |
| WO | WO2017144107 A1 | 8/2017 |
| WO | WO2020167997 A1 | 8/2020 |

* cited by examiner

DEEP BRAIN PATH PLANNING USING AUGMENTED REALITY

FIELD OF THE INVENTION

The invention relates to the determination of straight route to a target deep in the brain using medical imaging.

BACKGROUND OF THE INVENTION

Various tomographic medical imaging techniques such as Magnetic Resonance Imaging (MRI) and Computed Tomography enable detailed visualization of anatomical structure of a subject. MRI in particular can be used to image anatomical structures of a subject such as brain tissue and blood vessels. Surgeons planning a deep brain intervention often use multiple magnetic resonance imaging scans to image brain tissue during planning.

International patent application WO 2014139024 A1 discloses planning, navigation and simulation systems and methods for minimally invasive therapy using patient specific pre-operative images. The planning system allows for multiple paths to be developed from the pre-operative images, and scores the paths depending on desired surgical outcome of the surgery and the navigation systems allow for minimally invasive port based surgical procedures, as well as craniotomies in the particular case of brain surgery.

WO 2016/083927 A1 describes a method and a system for generating surgical path data. The method generates a plurality of paths from the outer surface to the target location, each path having a start point located on the outer surface, and an end point at the target location; for each of the plurality of paths, determines a score based on a comparison between the path and the anatomical data; and controls the display to present the outer surface and, at the locations of the start points, indications of the respective scores of the paths corresponding to the start points.

WO 2020/167997 A1 describes a system for modeling neurological activity. This system is configured to receive electroencephalogram ("EEG") data generated by an EEG device coupled to electrodes disposed on a brain, the EEG data comprising a plurality of waveforms representative of electrical activity. The system generates a graphical brain model representative of the brain, converts the EEG data into a graphical EEG model representative of electrical activity. This allows interaction with the EEG model within the context of the brain model; and communicate the integrated EEG and brain model to a display.

SUMMARY OF THE INVENTION

The invention provides for a medical system, a computer program, and a method in the independent claims. Embodiments are given in the dependent claims.

Embodiments of the invention may provide for an improved means of planning deep brain paths by an operator. To achieve this segmented medical imaging data is used to score various straight paths from the cranial surface to a target location within the brain. The score from the straight paths is then used to construct a three-dimensional path score surface which may then be rendered on the subject's cranial surface using an augmented reality system. Using the augmented reality system, the operator is able to see on the surface of the subject the best locations for a straight path to the target location.

In one aspect the invention provides for a medical system that comprises a memory storing machine-executable instructions. The medical system further comprises an augmented reality system configured for rendering virtual objects within a visual three-dimensional field of view of an operator. An augmented reality system as used herein that is able to combine the view of the real world and a projection of virtual objects. It also includes a real time interaction and an accurate 3D registration of virtual and real objects. Augmented reality systems provide an overlaid sensory information; typically, the augmented reality system has glasses or a viewing system that real components and digitally-constructed components in the subject's three-dimensional field of view.

The medical system further comprises a computational system. Execution of the machine-executable instructions causes the computational system to receive segmented medical imaging data descriptive of a continuous volume of the subject comprising at least a portion of the brain of the subject and a cranial surface of the subject.

Execution of the machine-executable instructions further causes the computational system to control the augmented reality system to determine a registration between the subject and the segmented medical imaging data. Execution of the machine-executable instructions further causes the computational system to receive a target location within the at least portion of the brain. Execution of the machine-executable instructions further causes the computational system to discretize the cranial surface to define multiple entry locations.

Execution of the machine-executable instructions further causes the computational system to determine a straight path for each of the multiple entry locations that extend to the target location. Execution of the machine-executable instructions further causes the computational system to assign a path score to the straight path for each of the multiple entry locations using the segmented medical imaging data. The segmented medical imaging data may for instance contain such information as the location of veins or arteries within the subject's brain. It may also contain information on various neurological structures that it would be desired not to destroy or to minimize damage to. The path score may be an effective measure of determining the likely damage to a subject from choosing each straight path.

Execution of the machine-executable instructions further causes the computational system to calculate a three-dimensional path score surface defined by the cranial surface and it is descriptive of the path score of each of the multiple entry locations. Execution of the machine-executable instructions further causes the computational system to render the three-dimensional path score surface using the augmented reality system. The rendered three-dimensional path score surface is positioned in the visual three-dimensional field of view of the operator using the registration. In other words, the three-dimensional path score surface is overlaid over the surface of the subject's head. The three-dimensional path score is then used to represent the costs or alternatively, the best place to reach the target location starting on different parts of the cranial surface. This may be an aid when a physician decides to perform an operation such as a biopsy or other procedure within the brain of the subject.

The registration between the augmented reality system and the actual cranial surface of the subject may be determined in different ways in different examples. In one example the augmented reality system may register the surface of the segmented medical imaging data to a detected surface of the subject. In other cases, the subject could be restrained in a particular location and this restraining of the subject may be used to provide an absolute registration between the augmented reality system and the cranial surface of the subject.

In some examples the target location could be predefined in the segmented medical imaging data. In other examples the target location could for example be received from the input of a user interface or may be retrieved from a storage medium or across a network. For example, the operator of the augmented reality system may select the target location using a user interface.

The cranial surface could, for example, include: the temporal region of the subject's head, the frontal region of the subject's head, the parietal region of the subject's head, and/or the occipital region of the subject's head.

In another embodiment execution of the machine-executable instructions further causes the computational system to determine an optimal path selected using the path score of each of the multiple entry locations. The optimal path could for example be selected by choosing a path score which minimizes the amount of projected damage to the brain of the subject. Execution of the machine-executable instructions further causes the computational system to render a three-dimensional medical implement positioning guide in the visual three-dimensional field of view of the operator.

The three-dimensional implement positioning guide is aligned with the optimal path. The type of implements that a physician would likely use would be needle-like. By having the three-dimensional medical implement positioning guide in the visual three-dimensional field of the physician may insert the medical implement along the optimal path without the use of restraints. This may for example enable the physician to perform a biopsy or other operation freehand.

In another embodiment the medical implement positioning guide is a ray-like or line-like marking in the three-dimensional visual field. The medical implement may for example have a long extension like a needle or rod and thus could be easily aligned with the ray-like marker freehand.

In another embodiment execution of the machine-executable instructions further causes the computational system to control the augmented reality system to detect an implement location descriptive of a three-dimensional location of the medical implement. Execution of the machine-executable instructions further causes the computational system to render a tool line indicator in the visual three-dimensional field of view of the operator if the implement location is aligned with the optimal path.

For example, the augmented reality system may have the capacity to register the locations of objects within the three-dimensional visual field of the subject. The augmented reality system could then be used to determine if the orientation of the medical implement is aligned with the optimal path. This may be beneficial because it may provide a further confirmation for the physician that the medical implement is in the proper position.

In another embodiment the medical implement is a biopsy needle.

In another embodiment the medical implement is a deep-brain stimulation implantable device.

In another embodiment the medical implement is a pulse generator insertion needle.

In another embodiment the medical implement is a needle.

In another embodiment the medical implement is a surgical needle.

In another embodiment the medical system comprises the medical implement.

In another embodiment the memory further comprises an elastic brain model configured for modifying the segmented medical imaging data in response to a puncture of the skull and/or draining of the cerebral fluid of the subject or partial draining of the cerebral fluid. The three-dimensional path score is corrected using the elastic brain model. The medical images taken to form the segmented medical imaging data are taken before a piercing or puncture of the skull. However, when the procedure is performed the skull of the subject will be punctured and the cerebrospinal fluid surrounding the brain may partially drain. This may cause a deformation or a change in the shape and/or position of the brain of the subject. This would then cause the target location to possibly move as well as the segmentations defining the different portions of the subject's brain. This may then cause a change in the path score for the various paths to the target location. The use of the elastic brain model may be beneficial because it may be used to predict how the brain will change once the skull is punctured. This may greatly reduce the amount of damage to a subject when a surgical path is chosen.

In another embodiment execution of the machine-executable instructions further causes the computational system to receive intermediate magnetic resonance imaging data descriptive of the continuous volume of the subject. Execution of the machine-executable instructions further causes the computational system to register the intermediate magnetic resonance imaging data to the medical imaging data. Execution of the machine-executable instructions further causes the computational system to modify the segmented medical imaging data using the registration for a deformable brain model. The modified segmented medical imaging data is used to recalculate the three-dimensional path score surface.

For example, after the skull of the subject has been punctured the subject can be placed into a magnetic resonance imaging system and the effects of the drainage of the cerebrospinal fluid can be measured and then used to update and recalculate the three-dimensional path score surface. This may have the effect of reducing the amount of damage to the subject during a procedure. It enables better planning. In another embodiment execution of the machine-executable instructions further cause the computational system to receive a selection from the augmented reality system of one or more of the multiple entry locations. Execution of the machine-executable instructions further causes the computational system to construct radiotherapy control commands configured for controlling a radiotherapy system for eradiating the target location along or directed along one or more radiotherapy paths that are defined by the one or more of the multiple entry locations. This may for example help the radiologist to properly plan and execute a radiotherapy plan. This may for example be useful for such radiotherapy systems as a gamma knife.

In another embodiment the medical system further comprises the radiotherapy system.

In another embodiment execution of the machine-executable instructions further causes the computational system to control the radiotherapy system with the radiotherapy control commands to irradiate the target location along the one or more radiotherapy paths defined by the selected one or more entry locations.

In another embodiment the medical system further comprises the radiotherapy system. Execution of the machine-executable instructions further causes the computational system to control the radiotherapy system with the radiotherapy system controls.

In another embodiment the segmented medical imaging data comprises segmented t2 weighted magnetic resonance imaging data.

In another embodiment the segmented medical imaging data further comprises segmented magnetic resonance imaging data.

In another embodiment the segmented medical imaging data further comprises segmented computed tomography magnetic resonance imaging data.

In another embodiment the segmented medical imaging data further comprises segmented functional magnetic resonance imaging data.

In another embodiment the segmented medical imaging data further comprises magnetic resonance angiography data.

In another embodiment the segmented medical imaging data assigns multiple tissue types three-dimensionally within the continuous volume. Each of the multiple tissue types is assigned a numerical damage value. The path score is calculated by determining a distance traveled through each of the multiple tissue types using the segmented medical imaging data times its numerical damage score. This may be beneficial because it may be an objective means of estimating the amount of damage to the subject for each of the insertion paths without actually or before a procedure is performed.

In another embodiment the segmented medical imaging data identifies critical anatomical structures. Execution of the machine-executable instructions further causes the computational system to exclude any stray path through any of the critical anatomical structures. For example, there may be particular parts of brain anatomy which would critically wound or injure the subject if they were damaged. This may be used to exclude such anatomical structures.

In another embodiment the segmented medical imaging data further comprises functional magnetic resonance imaging data descriptive of critical brain function regions. For example, during functional magnetic resonance imaging the regions which are related to the subject's ability to speak may be mapped in the brain. Execution of the machine-executable instructions further causes the computational system to exclude any straight-line path through any of the critical brain function regions. This embodiment may be beneficial because it may help reduce the chance that a particular brain function of the subject is damaged or destroyed.

As an alternative, to exclude any straight-line path through any of the critical brain functions for in addition to each of the critical brain function regions can be assigned a numerical brain function damage value. The path score that may be calculated by at least partially determining a distance traveled through each of the critical brain function regions times its numerical brain function damage score. This for example may be useful in minimizing particular types of functional damage to the subject such as a reduction in the subject's ability to speak. The score determined using the numerical brain function damage value may also be added to the numerical damage value determined using the tissue types. In this way there may be a tradeoff between physical damage and to functional damage which can be controlled.

In another embodiment, AR goggles may be used to receive feedback on the insertion angle. The feedback is preferably in real-time. In some embodiments, a color-coding is utilized to project the real-time feedback to the user of the AR goggles. Real-time feedback of the angle of the needle can for instance be expressed by a change of color of the entry point of the needle displayed through AR goggles. The angle of the needle may be monitored by means of the AR goggles that calculate the angle in real-time.

In another embodiment, AR goggles may be used to receive feedback on the speed of the needle to be inserted. The feedback is preferably in real-time. In some embodiments, a color-coding is utilized to project the real-time feedback of the speed of needle insertion to the user of the AR goggles. Real-time feedback of the speed of the needle can for instance be expressed by a change of color of the speed of the needle displayed through AR goggles. The speed of the needle may be monitored by means of the AR goggles that calculate the speed in real-time.

In another aspect the invention provides for a computer program comprising machine-executable instructions for execution by a computational system controlling a medical system. The computer program may for example be stored on a non-transitory storage medium such as a memory or other storage device. The medical system comprises an augmented reality system configured for rendering virtual objects within a visual three-dimensional field of view of an operator. Execution of the machine-executable instructions causes the computational system to receive segmented medical imaging data descriptive of a continuous volume of a subject comprising at least a portion of a brain of the subject and a cranial surface of the subject.

Execution of the machine-executable instructions further causes the computational system to control the augmented reality system to determine a registration between the subject and the segmented medical imaging data. Execution of the machine-executable instructions further causes the computational system to receive a target location within at least a portion of the brain. Execution of the machine-executable instructions further causes the computational system to discretize the cranial surface to define multiple entry locations. Execution of the machine-executable instructions further causes the computational system to determine a straight path for each of the multiple entry locations that extends to the target location. Execution of the machine-executable instructions further causes the computational system to assign a path score to the straight path for each of the multiple entry locations using the segmented medical imaging data.

Execution of the machine-executable instructions further causes the computational system to calculate a three-dimensional path score surface defined by the cranial surface and descriptive of the path score of each of the multiple entry locations. Execution of the machine-executable instructions further causes the computational system to render the three-dimensional path score surface using the augmented reality system. The rendered three-dimensional path score surface is positioned in the visual three-dimensional field of view of the operator using the registration. The three-dimensional path score surface may for example be positioned on the cranial surface defined in the segmented medical imaging data.

In another aspect the invention provides for a method of operating a medical system. The medical system comprises an augmented reality system configured for rendering virtual objects within a visual three-dimensional field of view of an operator. The method comprises receiving segmented medical imaging data descriptive of a continuous volume of a subject comprising at least a portion of the brain of the subject and a cranial surface of the subject. The method further comprises controlling the augmented reality system to determine a registration between the subject and the segmented medical imaging data. The method further comprises receiving a target location within at least a portion of the brain. The method further comprises discretizing the cranial surface to define multiple entry locations. The method further comprises determining a straight path for each of the multiple entry locations that extends to the target location. The method further comprises assigning a path score to the straight path for each of the multiple entry locations using the segmented medical imaging data. The method further comprises calculating a three-dimensional path score surface defined by the cranial surface and descriptive of the path score of each of the multiple entry locations. The method further comprises rendering the three-dimensional path score surface using the augmented reality system. The rendered three-dimensional path score surface is positioned in the visual three-dimensional field of view of the operator using the registration.

It is understood that one or more of the aforementioned embodiments of the invention may be combined as long as the combined embodiments are not mutually exclusive.

As will be appreciated by one skilled in the art, aspects of the present invention may be embodied as an apparatus, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer executable code embodied thereon.

Any combination of one or more computer readable medium(s) may be utilized. The computer readable medium may be a computer readable signal medium or a computer readable storage medium. A 'computer-readable storage medium' as used herein encompasses any tangible storage medium which may store instructions which are executable by a processor or computational system of a computing device. The computer-readable storage medium may be referred to as a computer-readable non-transitory storage medium. The computer-readable storage medium may also be referred to as a tangible computer readable medium. In some embodiments, a computer-readable storage medium may also be able to store data which is able to be accessed by the computational system of the computing device. Examples of computer-readable storage media include, but are not limited to: a floppy disk, a magnetic hard disk drive, a solid-state hard disk, flash memory, a USB thumb drive, Random Access Memory (RAM), Read Only Memory (ROM), an optical disk, a magneto-optical disk, and the register file of the computational system. Examples of optical disks include Compact Disks (CD) and Digital Versatile Disks (DVD), for example CD-ROM, CD-RW, CD-R, DVD-ROM, DVD-RW, or DVD-R disks. The term computer readable-storage medium also refers to various types of recording media capable of being accessed by the computer device via a network or communication link. For example, data may be retrieved over a modem, over the internet, or over a local area network. Computer executable code embodied on a computer readable medium may be transmitted using any appropriate medium, including but not limited to wireless, wire line, optical fiber cable, RF, etc., or any suitable combination of the foregoing.

A computer readable signal medium may include a propagated data signal with computer executable code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

'Computer memory' or 'memory' is an example of a computer-readable storage medium. Computer memory is any memory which is directly accessible to a computational system. 'Computer storage' or 'storage' is a further example of a computer-readable storage medium. Computer storage is any non-volatile computer-readable storage medium. In some embodiments, computer storage may also be computer memory or vice versa.

A 'computational system' as used herein encompasses an electronic component which is able to execute a program or machine executable instruction or computer executable code. References to the computational system comprising the example of "a computational system" should be interpreted as possibly containing more than one computational system or processing core. The computational system may for instance be a multi-core processor. A computational system may also refer to a collection of computational systems within a single computer system or distributed amongst multiple computer systems. The term computational system should also be interpreted to possibly refer to a collection or network of computing devices each comprising a processor or computational systems. The machine executable code or instructions may be executed by multiple computational systems or processors that may be within the same computing device or which may even be distributed across multiple computing devices.

Machine executable instructions or computer executable code may comprise instructions or a program which causes a processor or other computational system to perform an aspect of the present invention. Computer executable code for carrying out operations for aspects of the present invention may be written in any combination of one or more programming languages, including an object oriented programming language such as Java, Smalltalk, C++ or the like and conventional procedural programming languages, such as the "C" programming language or similar programming languages and compiled into machine executable instructions. In some instances, the computer executable code may be in the form of a high-level language or in a pre-compiled form and be used in conjunction with an interpreter which generates the machine executable instructions on the fly. In other instances, the machine executable instructions or computer executable code may be in the form of programming for programmable logic gate arrays.

The computer executable code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It is understood that each block or a portion of the blocks of the flowchart, illustrations, and/or block diagrams, can be implemented by computer program instructions in form of computer executable code when applicable. It is further under stood that, when not mutually exclusive, combinations of blocks in different flowcharts, illustrations, and/or block diagrams may be combined. These computer program instructions may be provided to a computational system of a general purpose computer, special purpose computer, or other programmable data processing apparatus to produce a machine, such that the instructions, which execute via the computational system of the computer or other programmable data processing apparatus, create means for implementing the functions/acts specified in the flowchart and/or block diagram block or blocks.

These machine executable instructions or computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The machine executable instructions or computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

A 'user interface' as used herein is an interface which allows a user or operator to interact with a computer or computer system. A 'user interface' may also be referred to as a 'human interface device.' A user interface may provide information or data to the operator and/or receive information or data from the operator. A user interface may enable input from an operator to be received by the computer and may provide output to the user from the computer. In other words, the user interface may allow an operator to control or manipulate a computer and the interface may allow the computer to indicate the effects of the operator's control or manipulation. The display of data or information on a display or a graphical user interface is an example of providing information to an operator. The receiving of data through a keyboard, mouse, trackball, touchpad, pointing stick, graphics tablet, joystick, gamepad, webcam, headset, pedals, wired glove, remote control, and accelerometer are all examples of user interface components which enable the receiving of information or data from an operator.

A 'hardware interface' as used herein encompasses an interface which enables the computational system of a computer system to interact with and/or control an external computing device and/or apparatus. A hardware interface may allow a computational system to send control signals or instructions to an external computing device and/or apparatus. A hardware interface may also enable a computational system to exchange data with an external computing device and/or apparatus. Examples of a hardware interface include, but are not limited to: a universal serial bus, IEEE 1394 port, parallel port, IEEE 1284 port, serial port, RS-232 port, IEEE-488 port, Bluetooth connection, Wireless local area network connection, TCP/IP connection, Ethernet connection, control voltage interface, MIDI interface, analog input interface, and digital input interface.

A 'display' or 'display device' as used herein encompasses an output device or a user interface adapted for displaying images or data. A display may output visual, audio, and or tactile data. Examples of a display include, but are not limited to: a computer monitor, a television screen, a touch screen, tactile electronic display, Braille screen, Cathode ray tube (CRT), Storage tube, Bi-stable display, Electronic paper, Vector display, Flat panel display, Vacuum fluorescent display (VF), Light-emitting diode (LED) displays, Electroluminescent display (ELD), Plasma display panels (PDP), Liquid crystal display (LCD), Organic light-emitting diode displays (OLED), a projector, and Head-mounted display.

A medical imaging data is defined herein as being the reconstructed two- or three-dimensional visualization of recorded measurements made by a tomographic medical imaging system that is descriptive of a subject. Segmented medical imaging data is defined herein as medical imaging data where anatomical regions have been identified or segmented.

A Magnetic Resonance Imaging (MRI) image or MR image is defined herein as being the reconstructed two- or three-dimensional visualization of anatomic data contained within the k-space data. This visualization can be performed using a computer. A magnetic resonance image is an example of medical imaging data.

K-space data is defined herein as being the recorded measurements of radio frequency signals emitted by atomic spins using the antenna of a Magnetic resonance apparatus during a magnetic resonance imaging scan.

BRIEF DESCRIPTION OF THE DRAWINGS

In the following preferred embodiments of the invention will be described, by way of example only, and with reference to the drawings in which.

DETAILED DESCRIPTION OF EMBODIMENTS

Like numbered elements in these figures are either equivalent elements or perform the same function. Elements which have been discussed previously will not necessarily be discussed in later figures if the function is equivalent.

Figure 1:
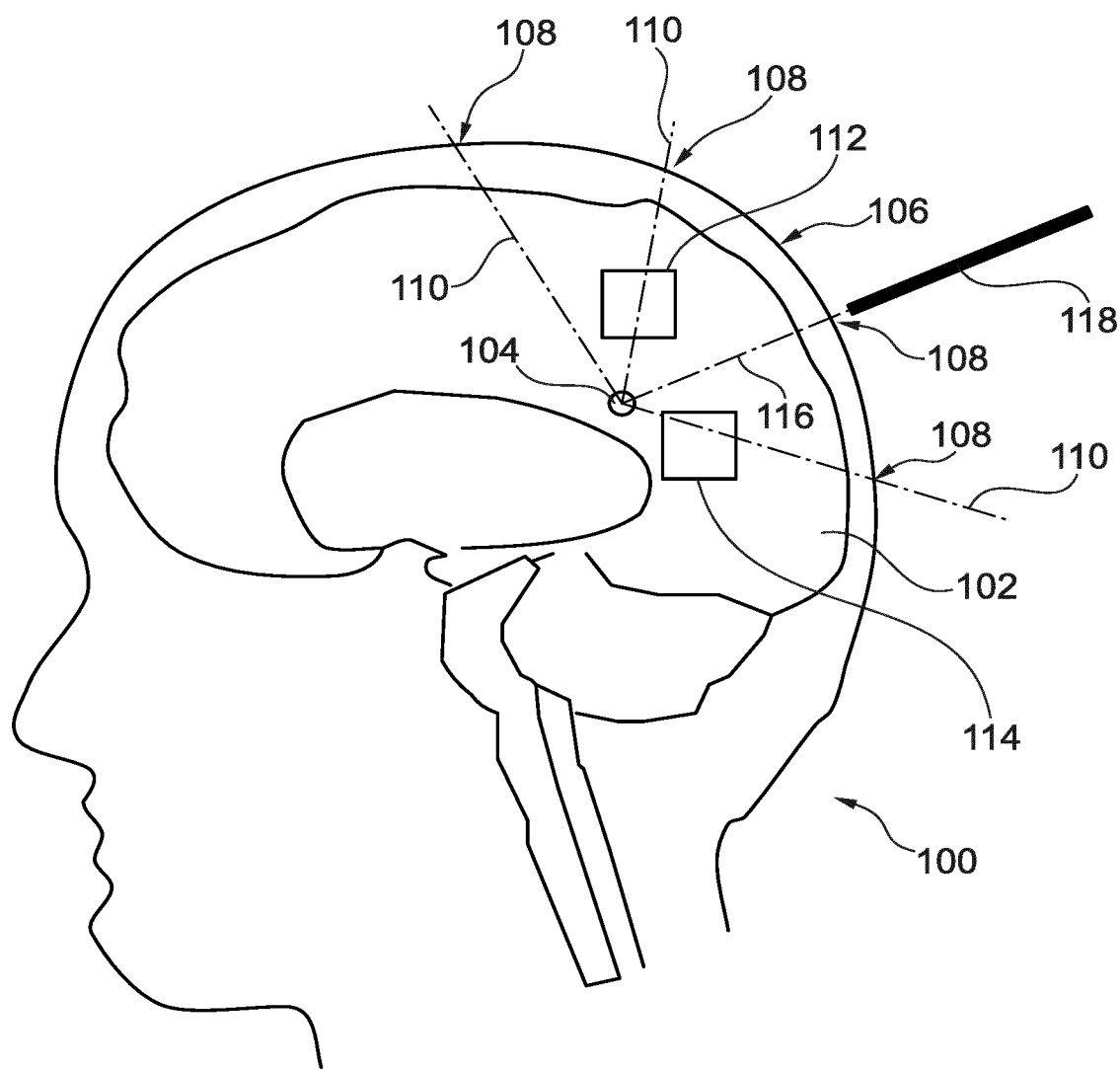
FIG. 1 illustrates how segmented medical imaging data can be used for planning paths to a target location within a brain.

FIG. 1 illustrates an example of a segmented medical imaging data 100 that can be used for planning a path to a target location 104 within a brain 102. The segmented medical imaging data 100 illustrates the brain 102 of a subject. Within the brain there is a target location 104. On the exterior of the subject is a cranial surface 106. The cranial surface can be divided into a number of discrete locations to define multiple entry locations 108. Between each of the entry locations 108 and the target location 104 there is a straight path 110. Each of these paths can be evaluated by assigning a path score to each of the paths 110.

The path score may be calculated in different ways. For example, the segmentation of the image 100 may provide different tissue types and the distance along the paths 110 within different tissue types can be used to calculate the path score. Additionally, there can be critical anatomical structures 112, which can for example be used to exclude paths or even data from functional magnetic resonance imaging which provides information on critical brain function regions 114. For example, if there is a desire to minimize the damage to the subject's speech, a functional magnetic resonance image which maps the speech function in the subject's brain may be used to define regions 114 which should be avoided or given a higher score. The path 116 is an exemplary optimal path. Using an augmented reality system, a three-dimensional medical implement positioning guide 118 could be displayed to the surgeon.

Figure 2:
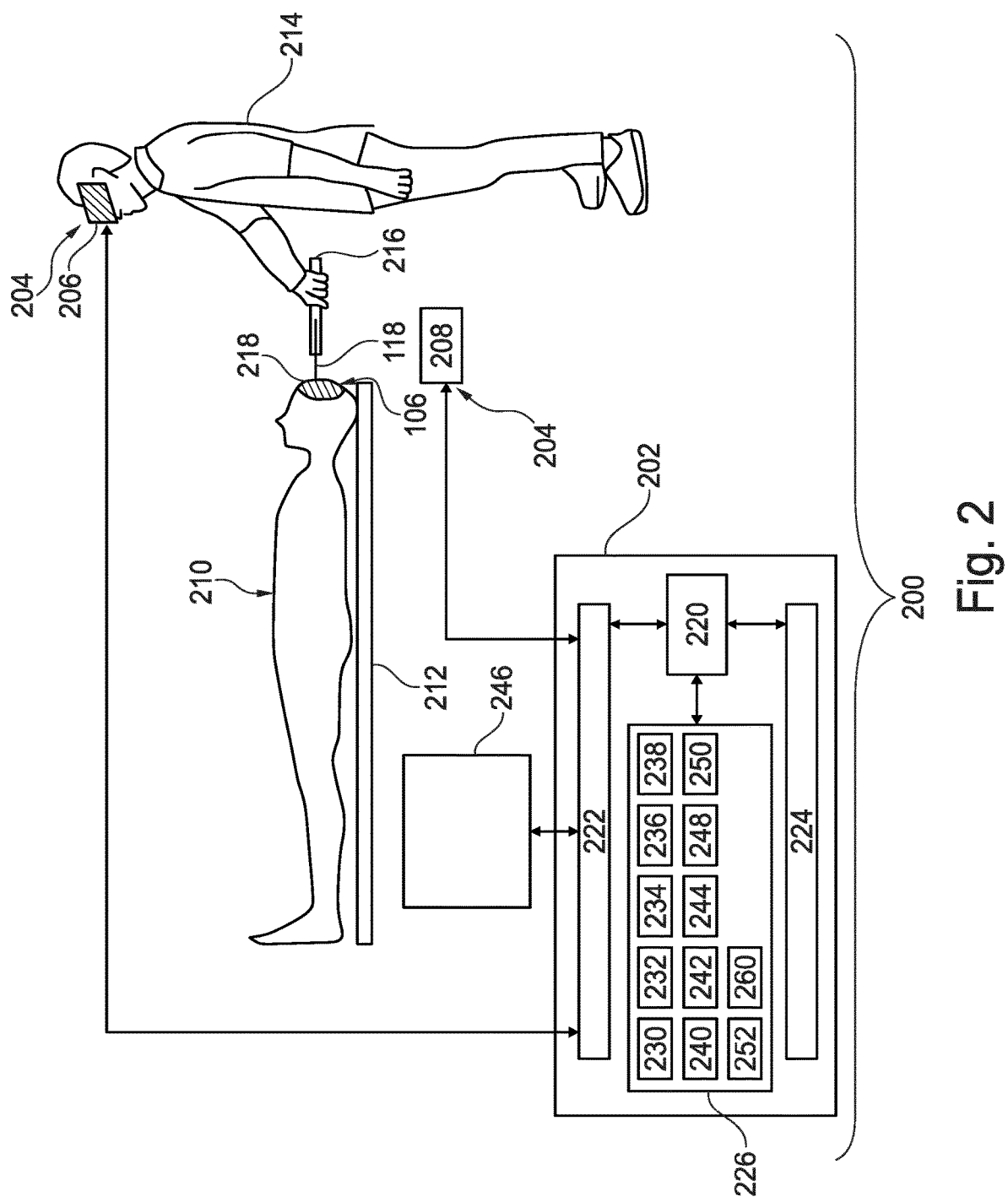
FIG. 2 illustrates and example of a medical system.

FIG. 2 illustrates an example of a medical system 200. The medical system 200 comprises a computer 202 and an augmented reality system 204. The augmented reality system 204 comprises augmented reality goggles 206 and a position registration system 208. In some examples the position registration system 208 may be multiple cameras or sensors for detecting the location of people as well as objects within the room. A subject 210 is shown as reposing on a subject support 212. In FIG. 1 the path scores for the various paths 108 were calculated. This is used to calculate a three-dimensional path score surface 218 which the augmented reality system 204 projects onto the cranial surface 106. The augmented reality system 204 also displays the three-dimensional path score surface 218. The operator 214 is able to align the medical implement 216 easily with the three-dimensional medical implement positioning guide 118.

The computer 202 is shown as comprising a computational system 220 that is connected to a hardware interface 222, an optional user interface 224, and a memory 226. The hardware interface 222 enables the computational system 220 to communicate and control other components of the medical system 200. The user interface 224 may for example enable the operator to modify and control the functionality of the medical system 200. The memory 226 is intended to be any sort of memory which is accessible to the computational system 220; this may include both volatile and non-volatile types of memory.

The memory 226 is shown as containing machine-executable instructions 230. The machine-executable instructions 230 enable the computational system 220 to control the medical system 200 as well as perform various types of data and image processing. The memory 226 is shown as containing segmented medical image data 232. The memory 226 is further shown as containing a registration 234 between the subject 210 and the segmented medical image data 232. The segmented medical image data 232 may for example be similar to what is rendered as item 100 in FIG. 1.

The memory 226 is shown as storing the position 236 of the target location 104. The memory 226 is further shown as containing path scores 238 that were calculated for the paths 110 in FIG. 1. The path scores 238 were then used to calculate a three-dimensional path score surface 240 which is then rendered as 218 by the augmented reality system 204. The memory 226 is further shown as optionally containing pulse sequence commands 242 for controlling an optional magnetic resonance imaging system 246. The memory 226 is shown as containing initial k-space data 244 that was acquired by controlling the magnetic resonance imaging system 246 with the optional pulse sequence commands 242. To acquire this data the subject 216 was placed in an imaging zone of the magnetic resonance imaging system 246. The initial k-space data 244 may be reconstructed and then segmented to provide the segmented medical image data 232 or 100.

After the subject's 210 skull has been punctured cerebrospinal fluid may drain. This may cause distortions or changes in the location of the subject's brain 102. After puncturing of the skull, the subject 210 may then be placed into the magnetic resonance imaging system 246 to measure intermediate k-space data 248. The same pulse sequence commands 242 may be used or even lower resolution pulse sequence commands. The acquired intermediate k-space data 248 may then be reconstructed to intermediate magnetic resonance imaging data 250. This may then be registered to the segmented medical image data 232 and a deformable brain model 252 may be used to correct the segmented medical image data 232. This corrected segmented medical image data 232 may then be optionally used to recalculate the path scores 238 and then update the three-dimensional path score surface 240.

In some examples an elastic brain model 260 is used to predict changes in the position and deformation of the brain 102 after a draining of cerebrospinal fluid. The elastic brain model 260 may be used to predict changes in the subject's brain anatomy and calculate more accurate path scores 238.

The rendering of the three-dimensional path score surface 218 may also additionally comprise additional aids to the operator 214 in properly positioning the medical implement 216. For example, the appearance of the rendering of the three-dimensional path score surface 218 may change. For example, it may change in size or color or brightness to indicate how well aligned the medical implement 216 with the three-dimensional medical implement positioning guide is. The augmented reality system 204 may also have printed messages or other symbols which are displayed to further indicate to the operator 214 how well the medical implement 216 is positioned with the three-dimensional medical implement positioning guide 118.

Figure 3:
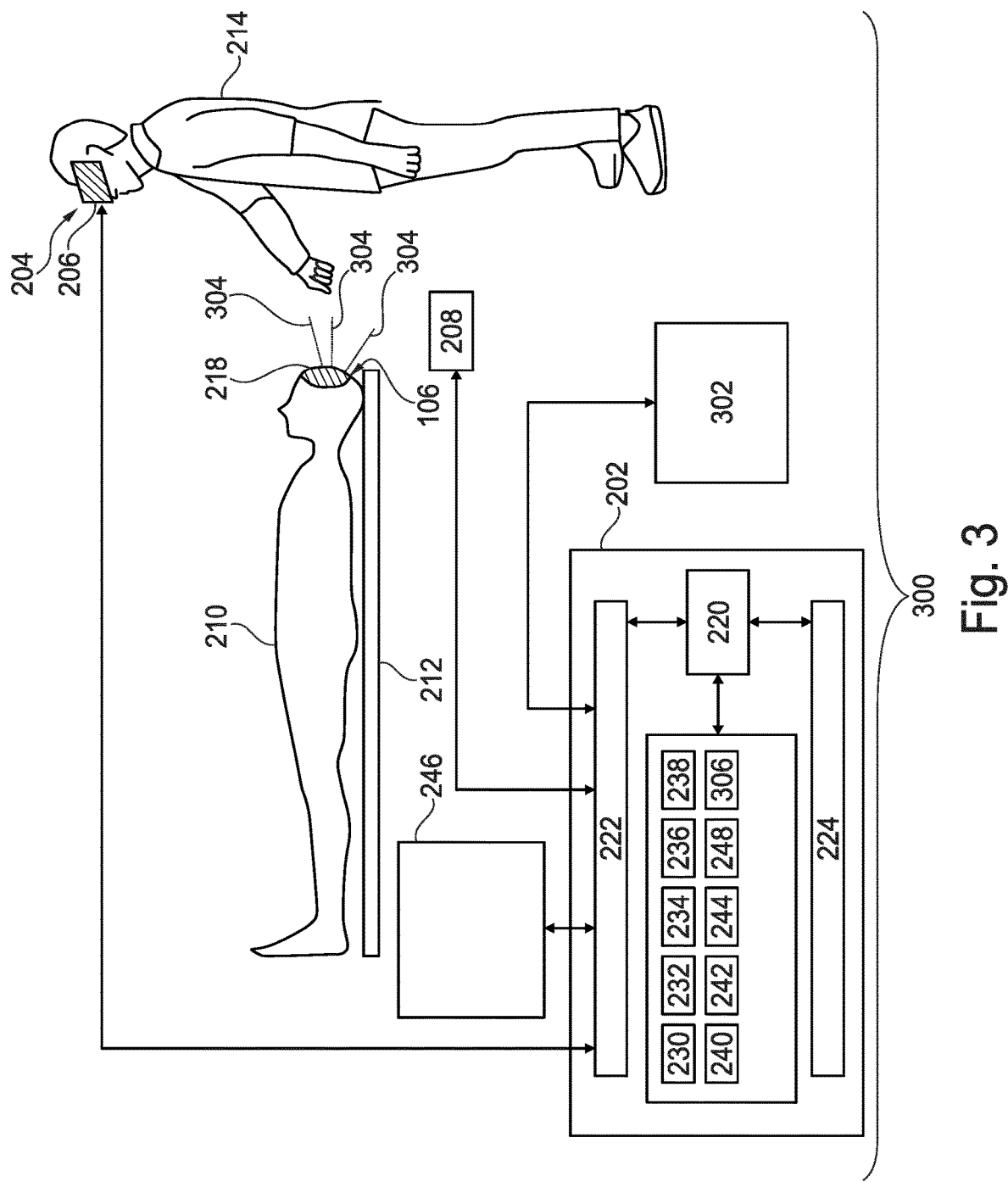
FIG. 3 illustrates a further example of a medical system.

FIG. 3 illustrates a further example of a medical system 300. The example illustrated in FIG. 3 is similar to the medical system 200 in FIG. 2 except that it additionally comprises an optional radiotherapy system 302. In this example, the medical system 300 is not being used to choose paths for mechanically inserting a medical implement 216, but instead is being used to select radiotherapy paths 304 for a radiotherapy treatment. The operator 216 is able to inspect the rendering 218 of the three-dimensional path score surface and select a number of entry points for radiotherapy paths 306 to irradiate the target location 104. The operator 214 selects the radiotherapy paths 304 and the system then generates radiotherapy system control commands 306 for eradiating along these paths 304. The subject 210 can for example be placed into the radiotherapy system 302 and the radiotherapy system 302 can be controlled with the radiotherapy system control commands 306.

Figure 4:
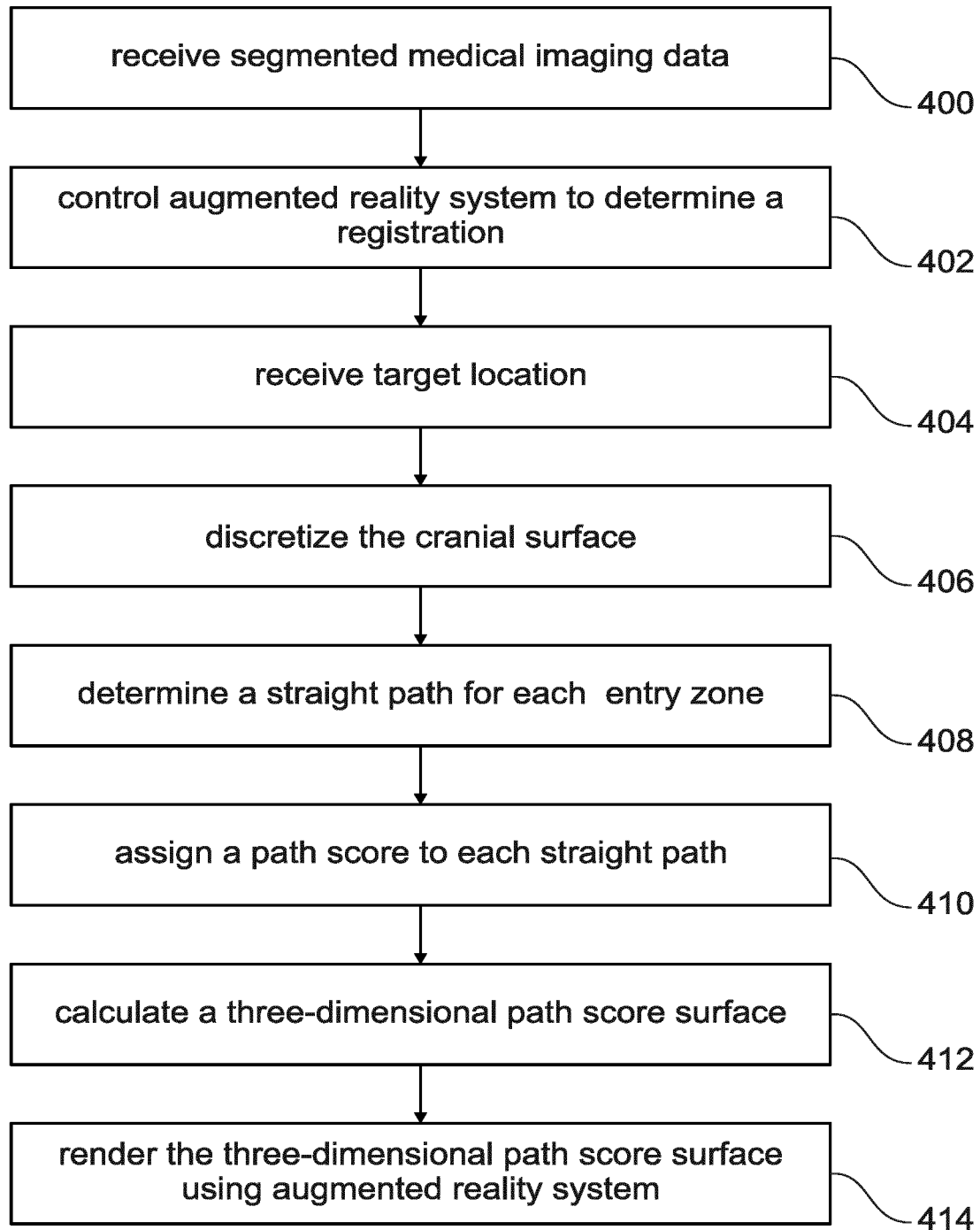
FIG. 4 shows a flow chart which illustrates a method of using the medical system of claim 2 or 3.

FIG. 4 shows a flowchart which illustrates a method of operating the medical system 200 in FIG. 2 or the medical system 300 in FIG. 3. First, in step 400, the segmented medical image data 100 or 232 is received. This segmented medical image data 100 describes a continuous volume of the subject 210 including at least a portion of a brain 102 and a cranial surface 106. Next, in step 402, the augmented reality system 204 is controlled to determine the registration 234. In this case, the position registration system 208 would be used. This may for example be done by using mechanical fixtures, optical systems or other sensor systems for determining the position of the subject 210 as well as the medical implement 216.

Next, in step 404, the position 236 of the target location 104 is received. Next, in step 406, the cranial surface 106 is divided into discrete locations to provide multiple entry locations 108. Next, in step 408, a straight path 110 is determined for each of the entry locations 108. Then a path score 238 is assigned to each of the straight paths 110 using the segmented medical imaging data 232 or 100. This for example can be done by using tissue types identified by the segmentation and then calculating the distance through which each type of tissue has travelled. Next, in step 412, a three-dimensional path score surface 240 is determined. Then in step 414, the three-dimensional path score surface 240 is rendered 218 using the augmented reality system and it is positioned identically with the cranial surface 106.

Examples may relate to systems and methods for planning, navigation, and simulation for the selection of the least-damaging straight approach route to a target deep in the brain with the help of Augmented Reality (AR).

In some examples color or greyscale may be projected onto the skull and used to indicate a sum score of damage factors (the rendering 218 of the three-dimensional path score surface 240). For example, a gradual red/green coloring projected on the skull via AR a sum score of damage factors (path scores 238) may be used. In fact, an indicator (three-dimensional medical implement positioning guide) for the best pathway through the brain to the deep brain target (target location 104). This way, the surgeon or operator is informed about the amount of vulnerable tissue (for instance blood vessels) that will be hit on the straight route starting from that position on the skull to the target deep in the brain. The AR goggle system may show the optimal entry point with, for example, a simple light beam (three-dimensional medical implement positioning guide 118) pointing straight to the target and assists the surgeon directly on the correct insertion angles. This indication is initially base on pre-registered MR images (segmented medical imaging data 100, 232). With special tissue deformation software (deformable brain model 252) the effects of making a hole in the skull and penetration of brain with a needle is estimated and the visualization of adapted accordingly. These estimations can be checked with real-time MR images done based upon 3D structural brain information from pre-registered MR images or real-time adapted tissue deformation after making a hole in the skull and penetration of the brain tissue. In this way the surgeon does not need a lexoframe any more for setting the correct insertion angles.

In daily practice the neurosurgeon plans an approach path for a needle (or a sharp medical device in general) with the help of several MR scans. They then have to check the path in reality with small stiff needles so that they don't damage elastic vessels. Other brain tissue is too soft to give feedback during the insertion of the needle. In other words, the neurosurgeon is blind for the kind of tissue the needle will penetrate during his travel through the brain on his way to the target area. This target area can be the location of the deep brain stimulation electrode position or a brain tumor, which needs extraction or puncture or visual inspection. Below a picture with the currently used framework, which is fixed to the head of the patient, correctly set the insertion angles for the probing needle. This framework may not be needed anymore in case an AR goggle is used to show the insertion angles.

Examples may use one or more pre-registered MR scans (segmented medical imaging data 100, 232) of the brain to investigate possibly multiple straight approach paths to the target area that is indicated by the neurosurgeon. A possible first step is to label all voxels in the MR image based upon tissue type (like brain fluid, blood vessel, white or grey matter) using the segmentation. The neurosurgeon can indicate a 'damage factor' (bigger number means more damage) for each tissue type (for instance brain fluid 0, white matter 5, grey matter 10 and blood vessel 25). The application may sum up all damage factors of all voxels that will be hit by one single straight path and translate the sum score (path scores 238) into a colored dot on the skull (rendering 218 of the three-dimensional pash score surface 240) of the patient at the starting point (cf. FIG. 5 below: darker means less damage in the path to the target).

As an example, AR goggles may be used to receive feedback on the insertion angle. The feedback is preferably in real-time. Color-coding may be utilized to project the real-time feedback to the user of the AR goggles. Real-time feedback of the angle of the needle can for instance be expressed by a change of color of the entry point of the needle displayed through AR goggles. As an example, 3 colors may be utilized in order to mark the change in position. When the needle is inserted in the correct angle, the color of the entry point is green, but when it moves outside an accepted range the entry point turns yellow and even red when it deviates too much. The angle of the needle is monitored by means of the goggles that calculate the angle in real-time.

Figure 5:
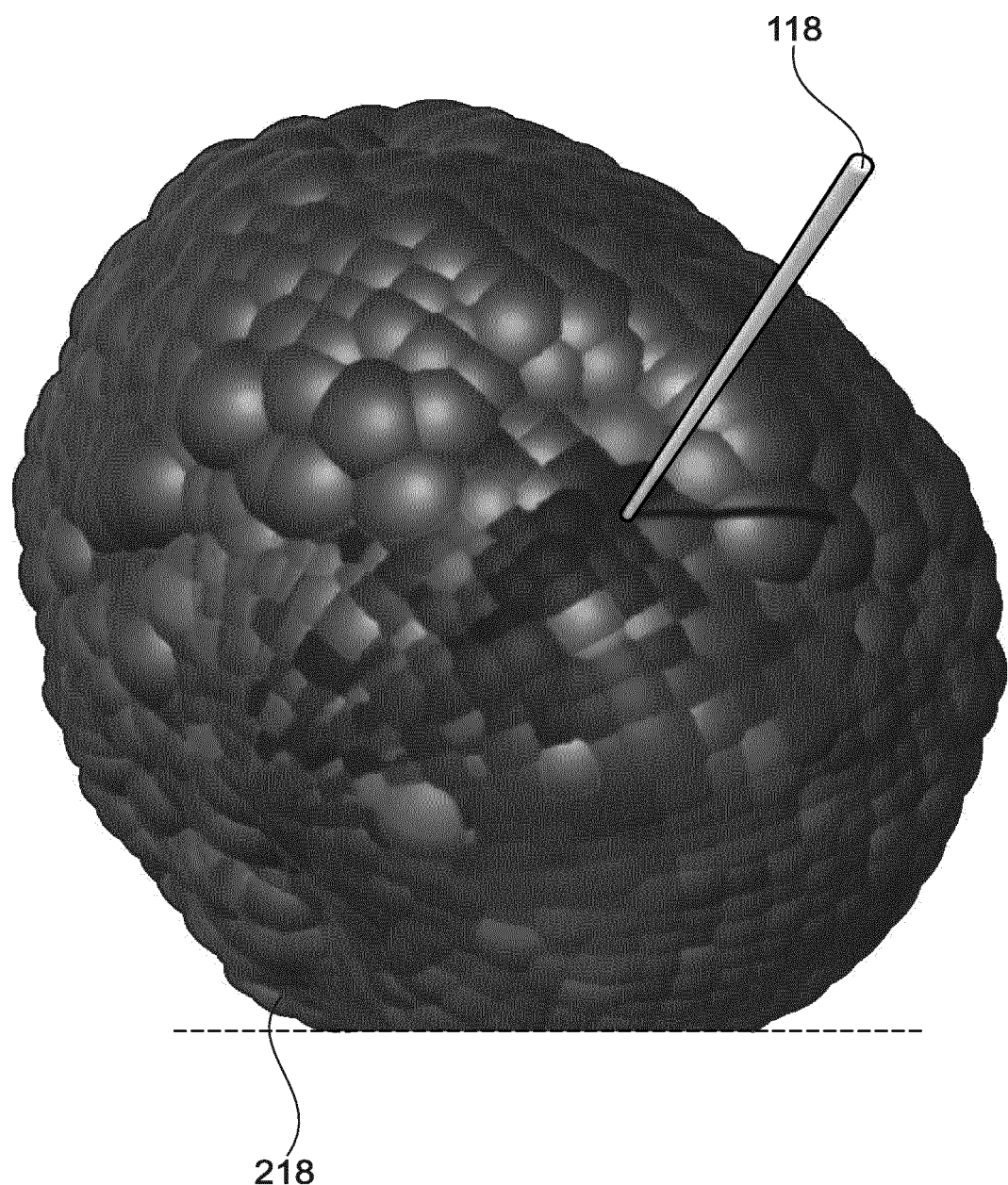
FIG. 5 illustrates an example of a rendering of three-dimensional path score surface.

FIG. 5 shows an exemplary rendering of the three-dimensional path score surface 218. The three-dimensional medical implement positioning guide 118 also referred to as the insertion angle indicator is displayed. On this surface the darker the region the less damage that a path from the cranial surface to the target location 104 is reduced.

Figure 6:
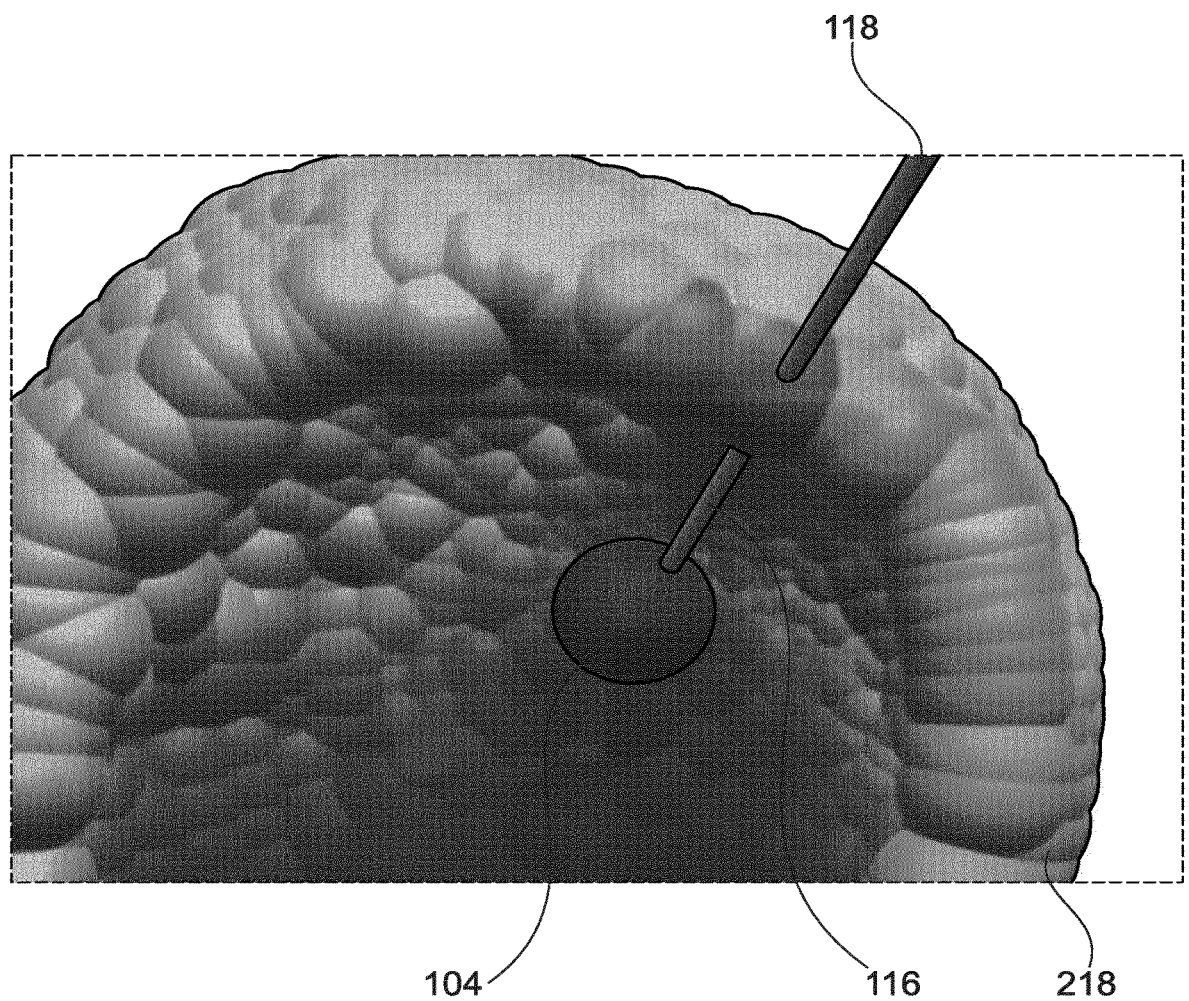
FIG. 6 illustrates a further example of a rendering of three-dimensional path score surface.

FIG. 6 shows a different view of the plot shown in FIG. 5. In this case, we are able to see within the three-dimensional model and we can see how the three-dimensional medical implement positioning guide 118 or the optimal path 116 reaches the target location 104.

The rendering of the three dimensional path score surface makes it easy for the neurosurgeon to select an approach path in the middle of a sweat spot (like the dark green area on top of the skull), that can tolerate small brain shifts, which will happen after drilling a small hole into the skull to insert the needle(s) and a small fraction of brain fluid will escape. In other words, the neurosurgeon has a quick overview of the damage of each approach path and can try to minimize the brain damage by adjusting the damage factors or reposition the target area. The AR goggle will show the optimal insertion orientation or angle as a light beam or positioning guide. The surgeon can use this beam for positioning his needle without using the framework, which will result in a quicker procedure to reach the target. The light beam can also show how far the needle needs to be inserted to reach exactly the target location.

As an example, AR goggles may be used to receive feedback on the speed of the needle insertion angle. The feedback is preferably in real-time. Color-coding may be utilized to project the real-time feedback to the user of the AR goggles. Real-time feedback of the angle of the needle can for instance be expressed by a change of color based on predetermined speed of the needle insertion depending on e.g. potential risk to the patient. As an example, 3 colors may be utilized to mark the speed of insertion. For instance, when the needle is at an acceptable speed that will hardly damage the brain, the color of the entry point is green, but when it moves outside an accepted speed range the entry point turns yellow and even red when the speed is outside of acceptable regions. The speed of the needle is monitored by means of the goggles that calculate the speed in real-time.

Examples may use voxel labelling in 3D space and damage categories to estimate the damage of each straight path between scalp entry point and target voxel. By labelling area in the brain (like motor or visual cortex, speech area, . . . ) and extra damage factor per area could be added.

Blood vessels, which are smaller than MR voxels, still can be labelled as blood vessels and thereby will be not overlooked in the damage overview.

Examples may enable neurosurgeons to make a better, robust and quicker brain surgery planning with a small as possible brain damage with the capability to avoid important brain regions. The AR goggle is very easy and intuitive to use and can avoid the use of a framework.

Figure 7:
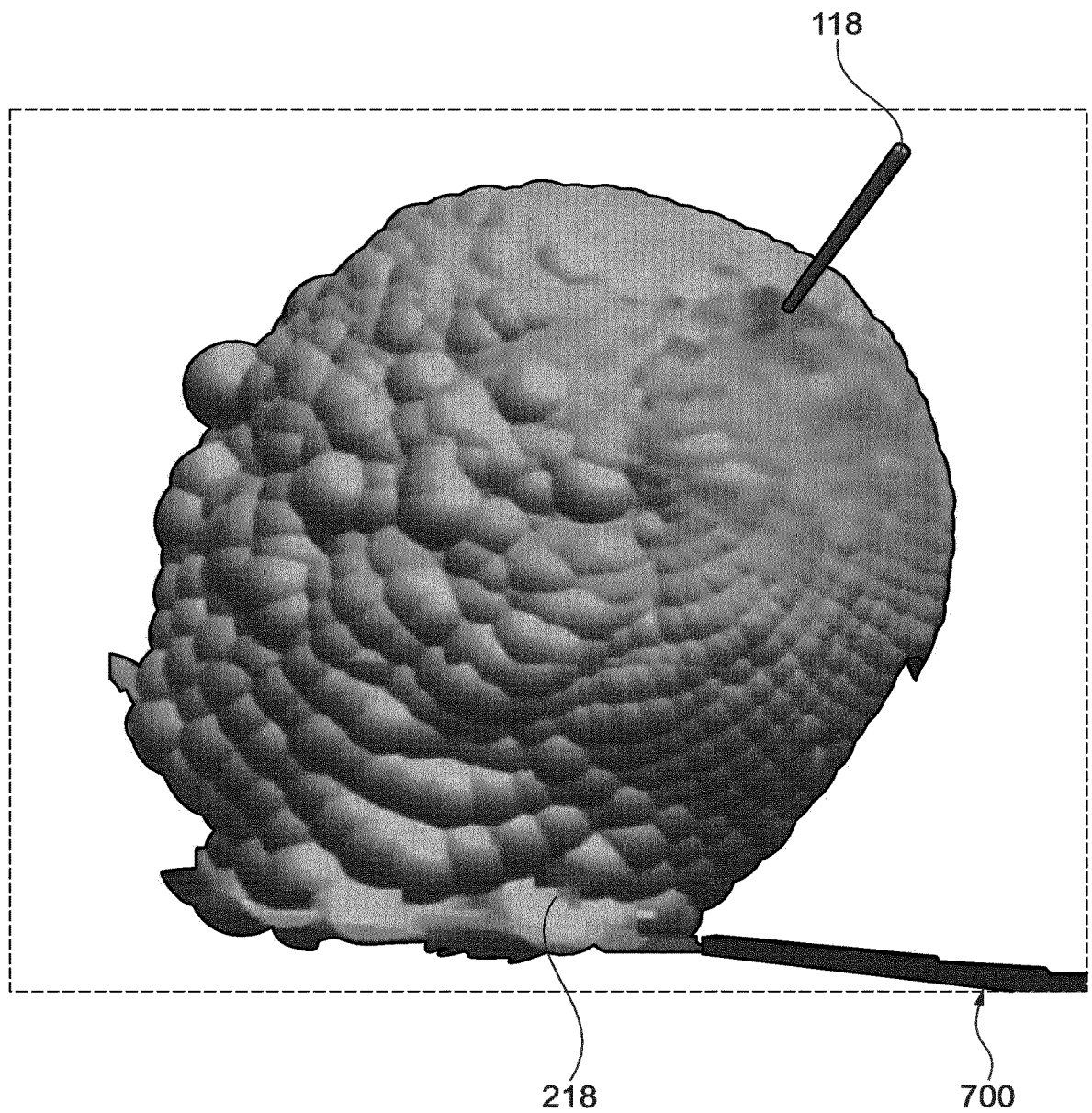
FIG. 7 illustrates a further example of a rendering of three-dimensional path score surface.

In one example a sum of damage factors is produced, based upon pre-registered structural MR images and all voxels on one single straight path. Next it will translate this sum score of damage factors into a colored dot projected artificially on the skull of the patient. FIG. 7 below shows the mapping of the sum score and optimal path mapped in the real world through the goggle. Because the goggle maps the path in the real world: it is very easy for the surgeon to put the needle in the optimal direction.

FIG. 7 illustrates the rendering 218 of the three-dimensional path score surface and the three-dimensional medical implement positioning guide 118 in the real world using an augmented reality display 700 to display the surface 218 on the cranial surface of the subject.

In an example, the sum score of damage factors (in fact an indicator for the best pathway through the brain to the deep brain target) is determined continuously in real-time based upon the real-time information available from the MR scanning. An advantage of determining the sum score of damage factors in real-time is that it can adapt this score to a change in angle and by a changing brain structure. It is known that both making a whole in the skull and penetration of a medical device into the brain may lead to changing structure of the sulci of the brain. This real-time method is therefore an adaptive method.

Real time MR imaging can be avoided with special software (deformable brain module 252), which estimate the deformation of the brain tissue after making a hole in the skull or insertion of a needle. The software starts with a pre-recorded MR scan, makes a segmentation to identify different brain tissue (like grey & white matter, fluid or blood vessels). Each tissue has its own mechanical properties, which enables tissue replacement and/or deformation estimations of surgeon actions like making a hole in the skull.

When the target (target location 104) is selected in the middle of a brain tumor the optimal path can be used for a quick and easy tissue puncture of the tumor.

For a brain tumor extraction, the AR system or goggle can show the drilling plan step by step by the light beam, which are adapted to the tissue changes after each extraction.

In another example, the structural information will be complemented by functional MRI information. fMRI provides information on functional areas such as speech area, or visual areas.

In another example the invention will be applied for a radiation beam.

While the invention has been illustrated and described in detail in the drawings and foregoing description, such illustration and description are to be considered illustrative or exemplary and not restrictive; the invention is not limited to the disclosed embodiments.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

REFERENCE SIGNS LIST 100 segmented medical imaging data of subject
102 brain
104 target location
106 cranial surface
108 entry location
110 straight path
112 critical anatomical structure
114 critical brain function region
116 optimal path
118 three-dimensional medical implement positing guide
200 medical system
202 computer
204 augmented reality system
206 augmented reality goggles
208 position registration system
210 subject
212 subject support
214 operator
216 medical implement
218 rendering of three dimensional path score surface
220 computational system
222 hardware interface
224 user interface
226 storage
230 machine executable instructions
232 segmented medical image data
234 registration
236 position of target location
238 path scores
240 three-dimensional path score surface
242 pulse sequence commands
244 initial k-space data
246 MRI system
248 intermediate k-space data
250 intermediate magnetic resonance imaging data
252 deformable brain model
260 elastic brain model
300 medical system
302 radiotherapy system
304 radiotherapy path
306 radiotherapy system control commands
700 augmented reality display

The invention claimed is:

1. A medical system comprising:
a memory storing machine executable instructions; and
a processor configured to execute the machine executable instructions to cause the processor to:
receive segmented medical imaging data descriptive of a continuous volume of a subject comprising at least a portion of a brain of the subject and a cranial surface of the subject;
determine a registration between the subject and the segmented medical imaging data in augmented reality;
receive a target location within the at least a portion of the brain;
discretize the cranial surface to define multiple entry locations;
for each entry location of the multiple entry locations,
determine a straight path for the entry location that extend from the cranial surface to the target location, and
assign a path score to the straight path for the entry location using the segmented medical imaging data;
calculate a three-dimensional path score surface defined by the cranial surface and is descriptive of each path score assigned for the multiple entry locations; and
render the three-dimensional path score on the cranial surface of the subject in the augmented reality, wherein the rendered three-dimensional path score surface is positioned in a visual three-dimensional field of view of an operator using the registration.

2. The medical system of claim 1, wherein the cranial surface is defined as an exterior surface of the subject.

3. The medical system of claim 1, wherein the processor is configured to execute the machine executable instructions to further cause the processor to:
determine an optimal path selected using the path score of each of the multiple entry locations, and
render a three-dimensional medical implement positioning guide in the visual three-dimensional field of view of the operator, wherein the three-dimensional implement positioning guide is aligned with the optimal path.

4. The medical system of claim 3, wherein the processor is configured to execute the machine executable instructions to further cause the processor to:
to detect an implement location descriptive of a three-dimensional location of a medical implement; and
render a tool aligned indicator in the visual three-dimensional field of view of the operator if the implement location is aligned with the optimal path.

5. The medical system of claim 3, wherein the three-dimensional medical implement is one or more of: a biopsy needle, a deep brain stimulation implantable device, a pulse generator insertion needle, a needle, and a surgical needle.

6. The medical system of claim 1, wherein the machine executable instructions include at least one machine executable instruction configured to modify the segmented medical imaging data in response to at least one of a puncture of a skull or draining of cerebral fluid of the subject, wherein the three-dimensional path score is corrected using the at least one machine executable instruction.

7. The medical system of claim 1, wherein the processor is configured to execute the machine executable instructions to further cause the processor to:
receive intermediate magnetic resonance imaging data descriptive of the continuous volume of a subject;
register the intermediate magnetic resonance imaging data to the segmented medical imaging data; and
modify the segmented medical imaging data using the registration for a deformable brain model, wherein the modified segmented medical imaging data is used to recalculate the three-dimensional path score surface.

8. The medical system of claim 1, wherein the processor is configured to execute the machine executable instructions to further cause the processor to:
receive a selection of the one or more of the multiple entry locations; and
construct control commands to irradiate the target location along the selection of the one or more of the multiple entry locations.

9. The medical system of claim 8, wherein the processor is configured to execute the machine executable instructions to further cause the processor to execute the control commands to irradiate the target location.

10. The medical system of claim 1, wherein the segmented medical imaging data comprises one or more of: segmented T2 weighted magnetic resonance imaging data, segmented magnetic resonance imaging data, segmented computed tomography magnetic resonance imaging data, segmented functional magnetic resonance imaging data, magnetic resonance angiography data, and combinations thereof.

11. The medical system of claim 1, wherein the segmented medical imaging data assigns multiple tissue types three-dimensionally within the continuous volume, wherein the respective multiple tissue types are assigned a numerical damage value, and wherein the path score is calculated by determining a distance traveled through the respective multiple tissue types using the segmented medical imaging data times its numerical damage score.

12. The medical system of claim 1, wherein the segmented medical imaging data identifies critical anatomical structures, and wherein the processor is configured to execute of the machine executable instructions to further cause the processor to exclude any straight path through any of the critical anatomical structures.

13. The medical system of claim 1, wherein the segmented medical imaging data further comprises functional magnetic resonance imaging data descriptive of critical brain function regions, and wherein the processor is configured to execute the machine executable instructions to further cause the processor to:
exclude any straight path through the critical brain function regions;
wherein each of the critical brain function regions is assigned a numerical brain function damage value, and wherein the path score is calculated at least partially by determining a distance traveled through each of the critical brain function regions times its numerical brain function damage score; and
combinations thereof.

14. The medical system of claim 1, wherein real-time feedback on insertion of a needle into the subject is received by the operator of the system using AR goggles.

15. The medical system of claim 14, wherein the real-time feedback reflects insertion angle of the needle, wherein changes in the insertion angle of the needle is expressed as a change of color.

16. The medical system of claim 14, wherein the real-time feedback reflects speed of insertion of the needle, and wherein the speed of insertion of the needle is expressed as a change of a color.

17. A non-transitory computer readable medium comprising machine executable instructions which, when executed by a processor, cause the processor to:
  receive segmented medical imaging data descriptive of a continuous volume of a subject comprising at least a portion of a brain of the subject and a cranial surface of the subject;
  determine a registration between the subject and the segmented medical imaging data in augmented reality;
  receive a target location within the at least a portion of the brain;
  discretize the cranial surface to define multiple entry locations;
  for each entry location of the multiple entry locations,
    determine a straight path for the entry location that extends from the cranial surface to the target location, and
    assign a path score to the straight path for the entry location using the segmented medical imaging data;
  calculate a three-dimensional path score surface defined by the cranial surface and is descriptive of each path score assigned for the multiple entry locations; and
  render the three-dimensional path score on the cranial surface of the subject in the augmented reality, wherein the rendered three-dimensional path score surface is positioned in a visual three-dimensional field of view of the an operator using the registration.

18. A method of operating a medical system the method comprising:
  receiving segmented medical imaging data descriptive of a continuous volume of a subject comprising at least a portion of a brain of the subject and a cranial surface of the subject;
  determining a registration between the subject and the segmented medical imaging data in augmented reality;
  receiving a target location within the at least a portion of the brain;
  discretizing the cranial surface to define multiple entry locations;
  for each entry location of the multiple entry locations,
    determining a straight path for the entry location that extends from the cranial surface to the target location, and
    assigning a path score to the straight path for the entry location using the segmented medical imaging data;
  calculating a three-dimensional path score surface defined by the cranial surface and is descriptive of each path score assigned for the multiple entry locations; and
  rendering the three-dimensional path score on the cranial surface of the subject in using the augmented reality, wherein the rendered three-dimensional path score surface is positioned in the visual three-dimensional field of view of the operator using the registration.

* * * * *